April 23, 1940.  C. L. C. MAGEE  2,197,807
GRIPPING DEVICE
Filed April 9, 1937     7 Sheets-Sheet 4

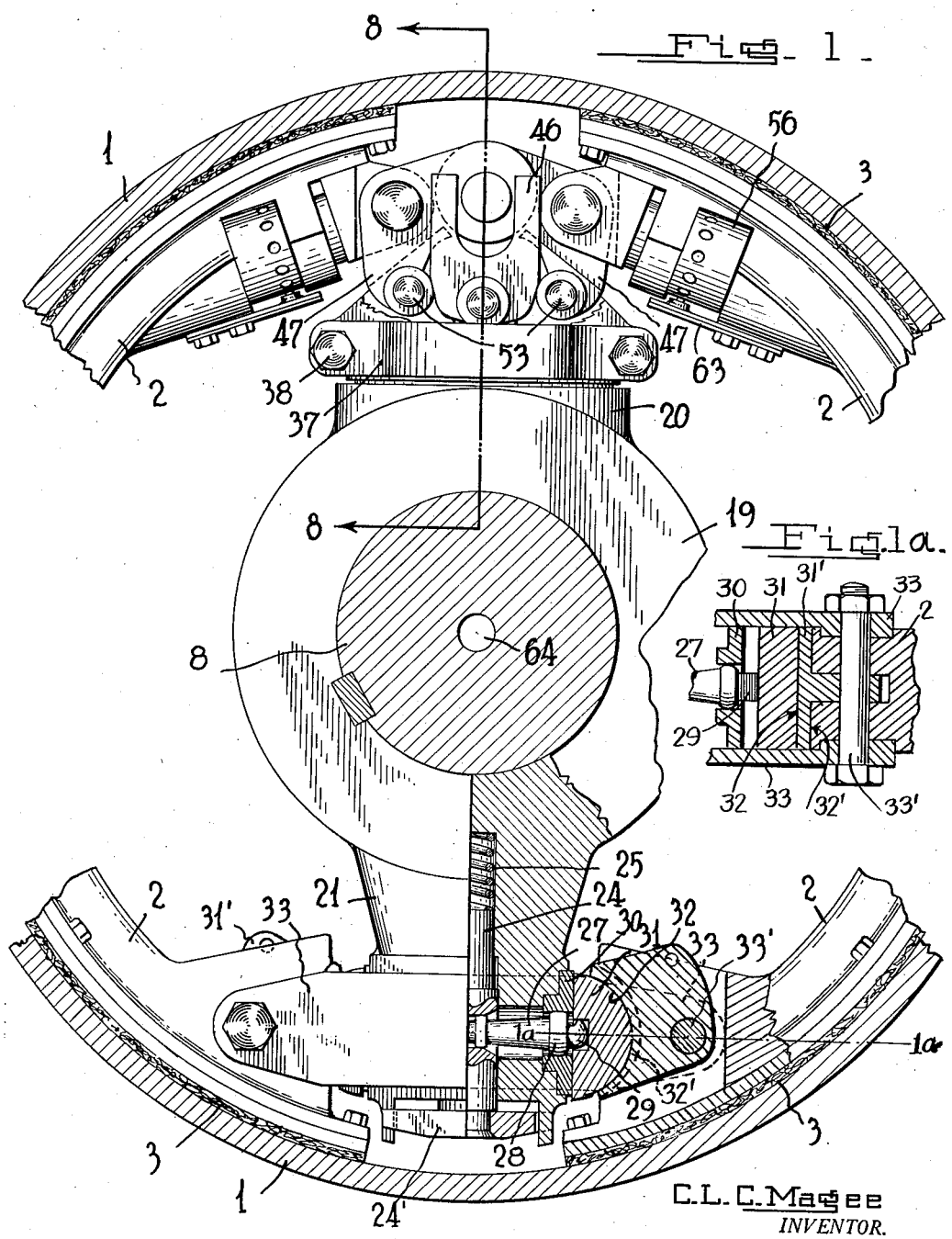

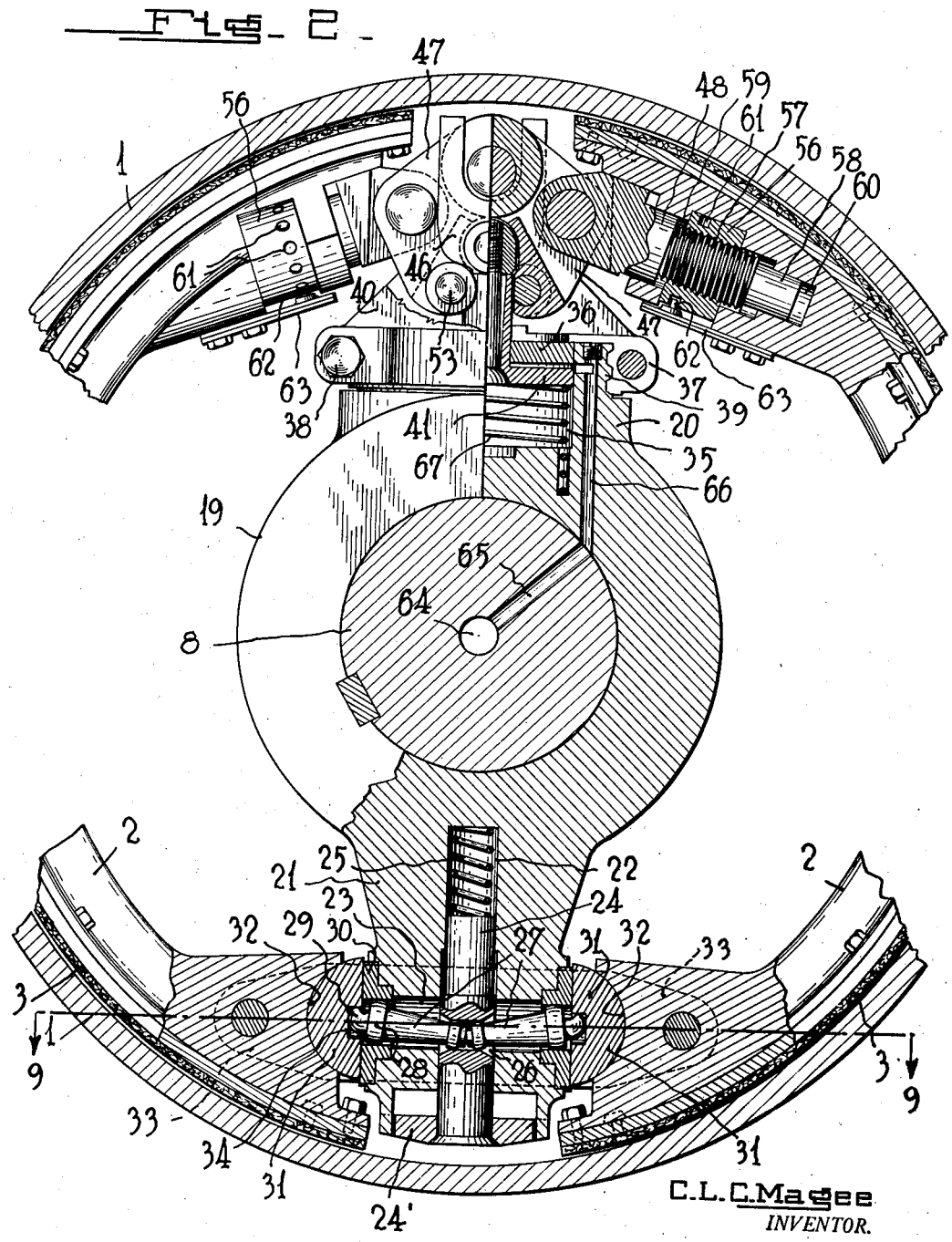

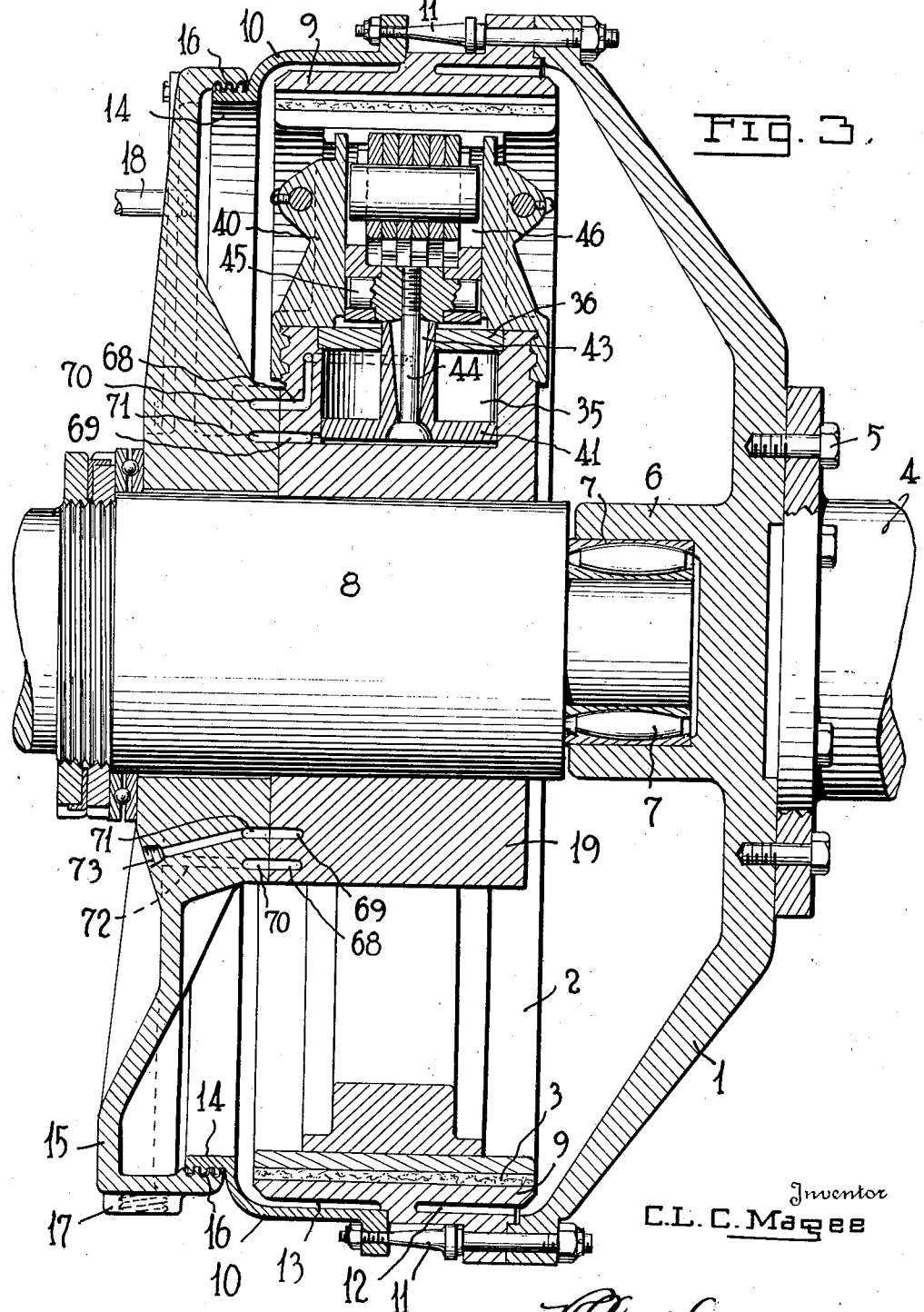

C.L.C. Magee
INVENTOR.

BY
ATTORNEY

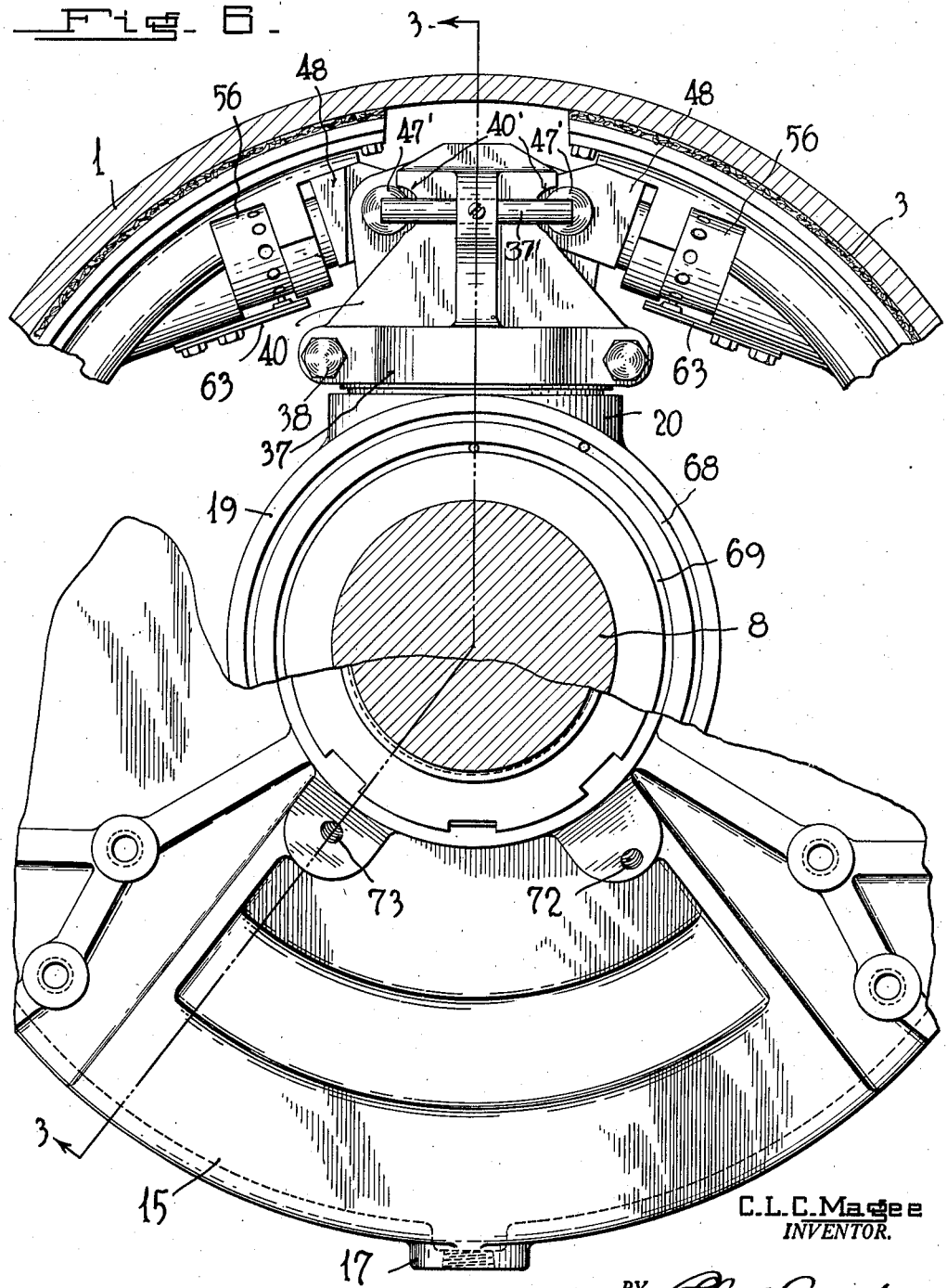

April 23, 1940.          C. L. C. MAGEE          2,197,807
                         GRIPPING DEVICE
                    Filed April 9, 1937          7 Sheets-Sheet 6

C. L. C. Magee
INVENTOR.
BY
ATTORNEY

April 23, 1940.　　　C. L. C. MAGEE　　　2,197,807
GRIPPING DEVICE
Filed April 9, 1937　　　7 Sheets-Sheet 7
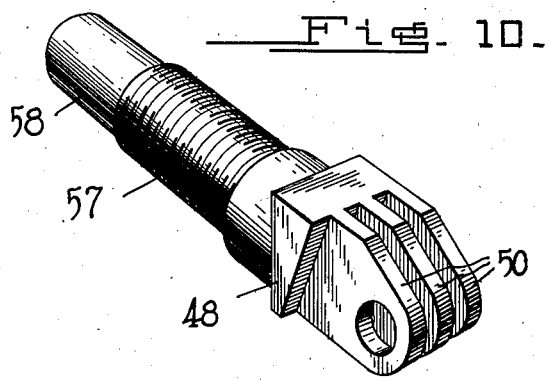
Fig. 10.
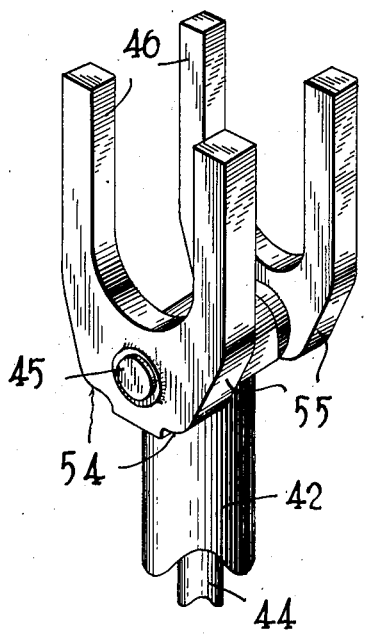
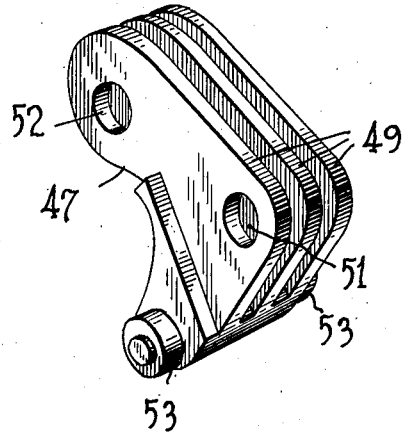
Fig. 11.
Fig. 12.
C. L. C. Magee
INVENTOR.
BY
ATTORNEYS.

Patented Apr. 23, 1940

2,197,807

UNITED STATES PATENT OFFICE 2,197,807

GRIPPING DEVICE

Chauncey L. C. Magee, Fontana, Wis., assignor to Magee-Marsh Corporation, a corporation of Delaware Application April 9, 1937, Serial No. 125,824

14 Claims. (Cl. 192—85)

This invention relates to certain improvements in gripping devices such as clutches and the like, with particular reference to the method of operation and novel cooperating instrumentalities for carrying out said method.

The object of the invention is the provision of a relatively simple yet efficient mechanism capable of transmitting power under the most severe working conditions without failure and without becoming overheated even when the clutching and declutching operations follow each other in rapid succession.

Another object of the invention is the production of a gripping device that can be operated from disengaged to full engaged position within a short period of time, so that there will be but slight appreciable lag in the transmission of power.

A further object is to provide a mechanism of the type indicated that will perform the various functions above stated, smoothly and positively without undue strain, shock or vibration.

A still further object is to produce a gripping device, that, owing to its fundamental principles of operation and construction, practically eliminates wear, straining and disarrangement of the parts.

Another object is to provide a gripping mechanism, that when once set and adjusted for the particular work to be performed, will require no attention, even though operated over extended periods of time and under strenuous working conditions.

Another object of the invention is the provision of a construction whereby the parts when inoperative, are so arranged that the gripping members are positively secured in disengaged positions, and means are also provided to insure and maintain these disengaged positions under stress of centrifugal force.

Another object of the invention is to provide an actuating mechanism, wherein unequal adjustments or movements of the gripping members within reasonable limits will not affect the average unit grip of the respective cooperating gripping areas or affect the mechanical functions or operation of said actuating mechanism.

The present invention also contemplates the operation of the clutch mechanism in oil, the object being to not only improve the gripping effect of the gripping surfaces but to lubricate the parts and to dissipate heat developed in the mechanism during the cycle of slipping, the said oil thereby acting both as a cooling and temperature limiting agent.

And further it is an object of the invention, to have a gripping device that has inherently and without regard for the manner operated, the characteristic always of a gradual increase in grip from zero to the maximum grip. This lack of sudden seizure in its gripping characteristic permits shockless engagement.

It is also a further object of the invention to apply the coolant to the heated surfaces under pressure and movement, as it is a well known fact that a coolant is more effective when it has both pressure and movement over a heated surface.

Another object of this invention is to provide a gripping device that will transmit continuous or periodic torque positively in either rotative direction, no matter how rapidly the torque reversal or change occurs, without lost motion at the instant of transition.

Further it is a fact that lubricating oil, because of film adhesion has a very tenacious grip on various substances, such as steel and the like which may be defined as the marginal contact, or the contact surface of the oil film with its mating steel surface, and it is an important object of the present invention to take advantage of the approach to and the condition of this marginal adhesion as a means whereby the gripping mechanism secures a softness of primary engaging and smoothness when in the cycle of slipping, and an extremely strong grip when fully engaged and not slipping, all of which being accomplished without actual attrition on the mating gripping surfaces, because the said marginal film functions as a separator between said mating surfaces.

And it is a further object of the invention to have a gripping device wherein two surfaces are in grip with each other because of their respective grip on a renewable during operation gripping substance between said surfaces, said substance being automatically renewed during slip therebetween when the gripping device is operated either to engage or disengage.

And it is a further object of the invention to provide a gripping mechanism which uses a renewable during operation gripping substance between the gripping surfaces of said mechanism that will automatically function regardless of the manner operated to always provide a progressively increasing grip from zero to the maximum, or a progressively decreasing grip from the maximum to zero.

The foregoing and other objects will be apparent upon a careful reading of the detail description to follow.

Generally stated in the broadest aspect, the present invention involves a novel gripping device comprising a gripping drum carried by either the driving or driven part, and a cooperating radially expanding and contracting member consisting preferably of two similarly constructed gripping shoes, said shoes being maintained in uniformly spaced relation with respect to the drum when in their inoperative or retracted position and in balanced relation with each other in all positions. For purposes of description members of this device or elements thereof may be referred to as upper or lower, it being understood of course that such description refers to their positions on the drawings, as during the operation of the device, the members may have no set position but may rotate with the gripping mechanism.

These gripping shoes are carried by a driving arm formed on a hub rigidly secured to either the driven or driving member according to the mounting of the cooperating drum, and by an actuating mechanism mounted on said hub diametrically opposite said driving arm. It will also be understood that although the mechanism will be described and referred to herein as a gripping device, the principles of operation and construction are adaptable to any arrangement where it is desired to intermittently couple and uncouple a rotating part to a part to be rotated, or as a brake to retard or stop a rotating part.

The heel or lower end of each gripping shoe is mounted on the said driving arm so as to permit both sliding and pivotal movements, except in circumferential directions, yet be positively maintained against all radial and circumferential movements when the complete assembly is in inoperative position. The circumferential movement to which we refer takes place only during the transition from operative to inoperative position and vice versa. In addition, the respective lower ends of the gripping shoes are connected together by a linkage which when combined with the said pivotal and slidable mounting provides a floating support automatically compensating for possible irregularities in the gripping surface of the drum and the application of the shoes during the operation of the clutch, but is rigid to forces in a circumferential direction.

The said supporting means contains a cylinder having mounted therein a controllable piston for operating the gripping shoes.

The cylinder head retainer is constructed with two upstanding parallel webs or flanges between which are resiliently mounted pivoted toggle members connecting the respective upper ends or toes of the gripping shoes.

The piston aforesaid is provided with a floating connecting rod extending upwardly through the cylinder head between said webs or flanges and secured to said connecting rod is a floating fork-like cam member embracing said toggle members, said cam member being formed with shoulders and cam surfaces adapted to engage successively certain portions of the toggle during the operation of the clutch, where, by initial movement of the expanding assembly a contact is caused between the lower or heel ends of the shoes and the drum, followed by a gradual spreading of the gripping shoes in the manner to be hereinafter more fully described.

The preferred embodiments of the invention are illustrated in the accompanying drawings in which:

Figure 1 is an elevational view of the improved gripping mechanism partly in section and Figure 2 is a similar view slightly modified more clearly showing in section the operating parts.

Figure 3 is a transverse sectional view on line 3—3 of Fig. 6 illustrating the detail construction and arrangement of the device casing and gripping drum, of the preferred type operating in oil.

Figure 6 is a view partly in section and partly in elevation illustrating the cover in position and the inlet and outlet connections for the operating fluid in said cover said view also showing the ring grooves and their relation to the pressure cylinder and said inlet and outlet connections.

Figures 10 and 11 illustrate enlarged detail views of the toggle parts.

Figure 12 is an enlarged detail view of the novel cam adapted to cooperate with said toggle in the operation of the device.

Figures 4, 5:
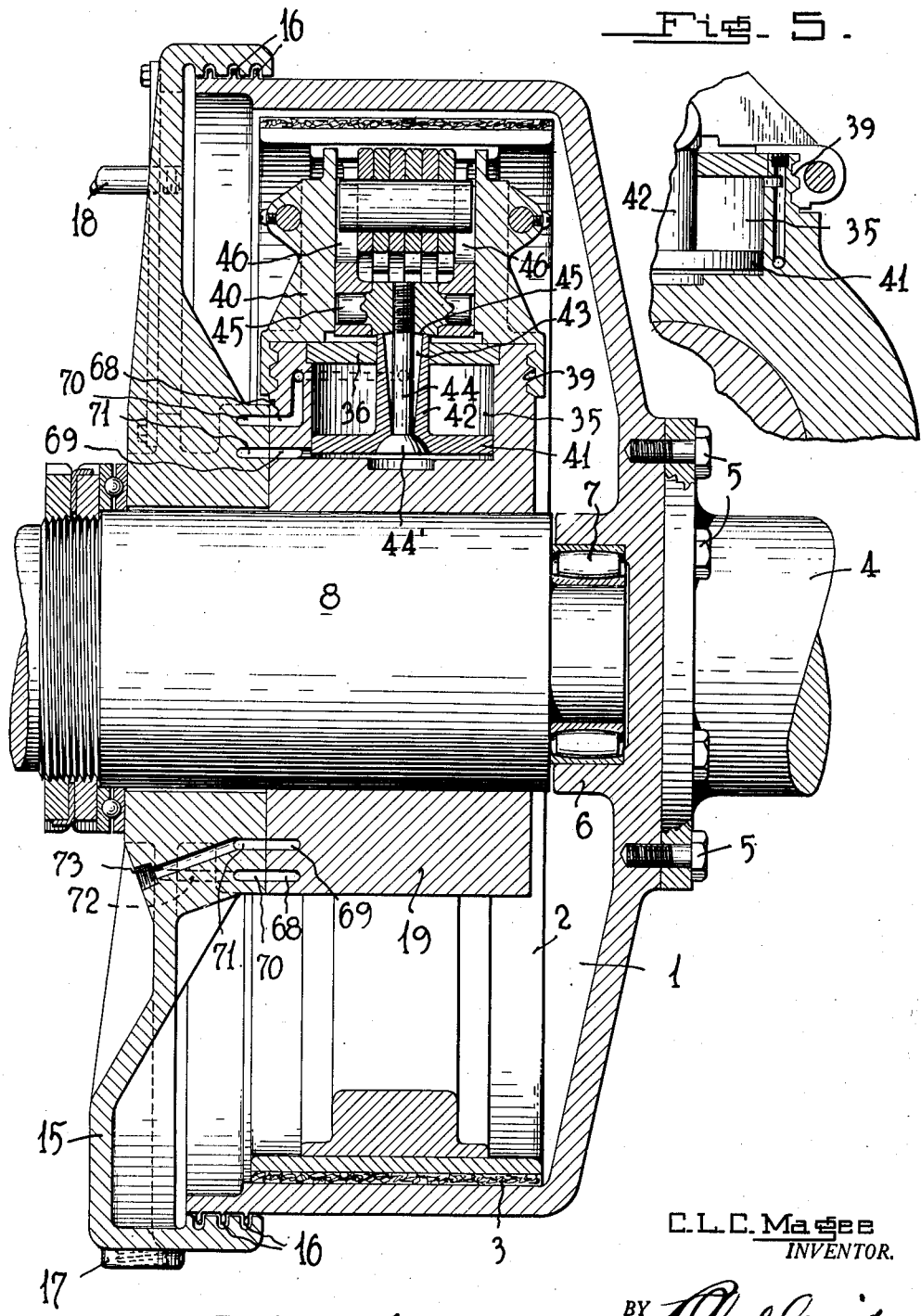
Figure 4 is a similar transverse sectional view illustrating a simplified type of casing and drum together with means for admitting and exhausting the operating fluid to and from the pressure cylinder by way of cooperating ring-like grooves.
Figure 5 is a partial sectional view showing in more detail the necessary connecting passages from the ring grooves to and from the pressure cylinder.

In Figs. 1, 2, 8 and 9 the casing surrounding the structure has been omitted.

Referring to the drawings in detail with particular reference to Figures 1 and 2, the improved gripping device comprises a gripping surface or drum 1 and a pair of diametrically oppositely disposed gripping shoes or the like 2 said shoes being provided preferably with an asbestos type of lining or facing 3.

As illustrated for the purpose of this description, the gripping drum 1 is rigidly secured to the rotated shaft 4 (Figs. 3 and 4), by a series of suitable bolts or the like 5. This gripping drum 1 is constructed with an internal annular hub 6 providing a mounting for an antifrictional roller or ball cage 7 to receive the reduced end of the driving shaft 8, as clearly shown in Figures 3 and 4, this bearing being preferably spherically mounted.

With particular reference to Figure 3 this gripping drum is preferably an assembled construction with the gripping surface per se, formed as a separate annular ring-like member 9 and cooperating with said annular ring-like member and spaced therefrom is a second annular member 10, all of said parts being rigidly secured together by bolts or the like 11. It will be noted that the gripping ring 9 is constructed so as to provide an annular space 12 around a portion of its outer face similar to the space 13 formed around the remaining portion of its outer face, between said latter portion and the annular member 10, the purpose of said spacing being to assist in the cooling of said friction ring in the manner to be hereinafter more fully described.

Again referring to Figure 3, the annular member 10 is provided with an outwardly extending flange 14 defining an opening of less diameter than the gripping ring 9 and this flange 14 is adapted to extend into and cooperate with a stationary casing 15 as clearly shown in Figures 3 and 4, a liquid seal joint 16 being provided at this point.

With this construction, the desired amount of oil will be retained, therein, all excess oil overflowing the flange 14 into the stationary cover 15 where it is drained off through the outlet 17 (Figs. 3, 4 and 6) to be cooled and again returned to said casing under pressure through the opening 18. Where it is not desired to retain a quantity of oil in the casing, the type of gripping drum as illustrated in Figure 4 may be employed. Any suitable means which will return cool oil into the casing other than through opening 18 indicated herein are contemplated, and obviously other procedures therefor are apparent. In Figure 4 a continuous throughput of cool oil would be contemplated procedure.

Mounted within the casing 1, on the rotating member 8 and rigidly secured thereto, is a support 19 provided with diametrically oppositely disposed means 20 and 21 for carrying the internal working parts of the gripping mechanism. These means for the purpose of illustration, description and the claims are shown, and will be referred to as upper supporting means 20 and driving arm 21, but of course, it will be understood that during the operation of the gripping device these means may have no set position but may rotate with the gripping mechanism.

The driving arm 21 is provided with a radial bore 22 and a transverse intersecting bore 23. Mounted in the bore 22 is a plunger 24 and a compression spring 25 said spring tending to urge the plunger 24 outwardly. This plunger at its intermediate portion is constructed with a transverse opening 26 to receive the inner ends of a pair of equalizing levers 27 positioned in the transverse bore 23. These levers 27 are preferably of conical form each having an enlarged fulcrum portion 28 and a head 29, said head extending outwardly beyond the outer ends of the bore 23.

Carried by the lower or outer end of the plunger 24 is a weight 24' which weight, plus the weight of the plunger 24, in addition to the force of the spring 25, provides the necessary counter balancing means for the lower ends of the shoes when subjected to centrifugal force.

At the fulcrum point of the levers 27, adjacent the outer openings of the bore 23, are secured bearing members 30, against the outer face of which are mounted for sliding engagement, semi-spherical or semi-cylindrical pivot members 31. These oppositely disposed pivot members 31 are adapted to be retained in corresponding semi-spherical or semi-cylindrical cavities 32 formed in the lower ends of the gripping shoes 2 and this whole lower assembly is secured and maintained in relative position by flexible cross connecting links or the like 33 as more clearly shown in Figures 2 and 9.

The links 33 act solely as tension members, and the connections therefor provide adequate clearance to prevent interference with the described operation of the shoes.

Figure 9:
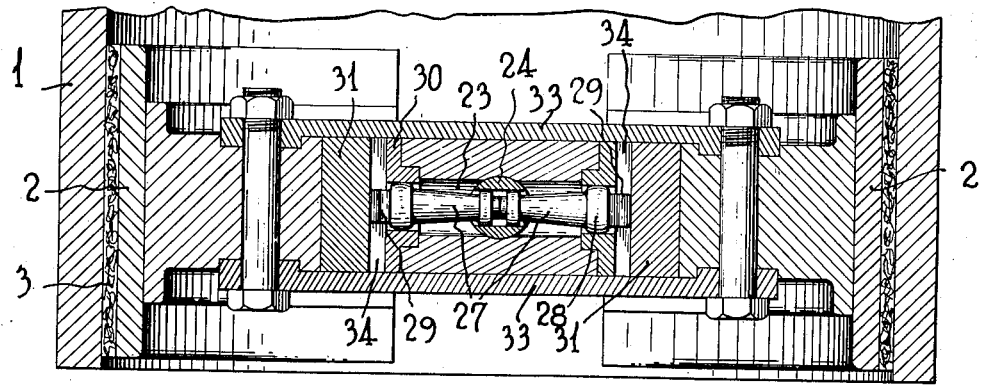
Figure 9 is a sectional view on line 9—9 of Fig. 2.

The connection of the links 33 to shoes 2 by the bosses on the ends of links 33 that mate the fitting cavities for said bosses in the shoes 2 and as shown in Figure 9, are such that shoes 2 in a disengaged position will be permitted circumferential movement toward driving arm 21 only during the transition from disengaged to engaged position and vice versa, but when in gripping position a pressure contact results between shoes 2 and driving arm 21 through bearing members 30, pivot members 31 and shoe eccentrics 31', and further it is obvious that when said shoes are in their gripping or engaged position with the drum that there is no lost motion between said driving arm 21, bearing members 30, pivot members 31, shoe eccentrics 31' and shoes 10 2 in a circumferential direction. This circumferential movement is defined and used to take up the clearance that would normally be provided in manufacturing the parts. When disengaged or inoperative the mating surfaces of 15 parts 30 and 31, parts 31 and 31', parts 31' and 2 would separate sufficiently to allow a film of oil to enter therebetween. Centrifugal force under this inoperative condition acting on part 31 would maintain this spaced relation as such to permit only an oil film therebetween,—links 33, pins 33' acting to prevent separation beyond limits defined by manufacture of shoes 2, thus completing the structure of the assembly. It also will be noted that because of the plane face on one side and the semi-spherical or semi-cylindrical face on the other side of pivot members 31 that this construction permits displacements by shoes 2 in all directions except circumferentially without lost motion resulting. Obviously during the change from engaged to disengaged position and vice versa, there is a certain limited adjustment to take up the tolerances necessary in manufacture. The optional usage of eccentric 31' is determined by operating considerations. It is further obvious that this construction without gripping surfaces and with the shoe eccentrics 31' held in a position that did not permit lost motion would result in a coupling with the characteristics as above defined.

Part 31', the shoe eccentric, best shown in Figs. 1 and 1ª, is defined as having optional usage. It is interposed between the surfaces 32 and 32', and is in the form of an arcuate wedge. Its purpose is this: Due to its construction the eccentricity between the surface where part 31 mates with it and the shouldered portion indicated by the dotted line where part 31' mates with shoe 2, it is possible at the time of initial adjustment to drill the hole for bolt 33' with this eccentric positioned to take up or adjust to clearances in the fits of mating surfaces of parts 30, 31, 31' and 2 that developed in manufacture and permit fitting accuracies not otherwise as readily feasible. When assembled as shown, the part 31' is not thereafter displaced or changed in position.

These cavities 32 as shown in Figure 2 are formed directly in the lower ends of the shoes 2 but for the purpose of ease in assembling and adjusting said cavities may be provided in separate, eccentrically pivoted intermediate members 31'. In this arrangement as illustrated in Figure 1, the lower end of the shoe 2 is bifurcated providing a slot or recess in which the shoe eccentric 31' is positioned and secured by a bolt or 65 the like 33'. This bolt 33' holds the eccentric in the desired position.

The inner flat face of each member 31 is provided with a central cavity or groove 34 to receive the respective heads 29 of the equalizing 70 levers 27, whereby the semi-spherical or semi-cylindrical members 31 together with the lower ends of the friction shoes 2 will normally be retained in their innermost or retracted positions by the locking means provided by toggle pins 41' 75 and sockets 40', and helped thereto by the outwardly directed force exerted on the inner ends of the levers 27 by the spring pressed plunger 24 and weight 24' connected thereto, as clearly shown in Figure 2. It will be noted upon referring to Figures 1 and 2, that there is a slight play permitted between these heads 29 and their cooperating cavities 34, for the purpose to be hereinafter described.

With this construction and arrangement, the gripping shoes will be capable of axial and also inward and outward radial movements as a unit due to tolerances or express provision in manufacture yet at the same time within predetermined allowable limits, be permitted such movements individually and thereby compensate for any irregularities in either the gripping drum or the application of the gripping shoes during the operation of the device. In addition to said inward and outward movements, by reason of the slidable bearing contact between the members 30 and 31, a pivotal or swinging bearing is provided about the curved outer face of the member 31 between said face and the corresponding cavities 32 formed in the lower ends of the gripping shoes 2.

The gripping device actuating mechanism is carried by the upper means 20 of the hub 19. This means 20 is provided with a relatively large cylindrical bore 35 and a cylinder head 36, said head being maintained in place by a pair of complementary head clamping members 37 secured together by bolts or the like 38. Each of these clamping members 37 is provided with a downwardly extending flange secured to the supporting means containing the cylinder 35, said securing means being formed with interlocking tongues and grooves 39, as illustrated in Figures 2, 4 and 5. Each of these head clamping members 37 is constructed with an upstanding web or flange 40, (Figs. 4 and 6) provided with sockets 40' and resilient positioning members 37', providing a housing for the toggle mechanism to be hereinafter described.

These members 37' are in the form of pins held in place on part 37 by set screws. Their purpose is to resiliently restrain in an axial direction pin 47' and thus in turn resiliently restrain the entire expanding assembly which is carried by pins 47, shown in Fig. 7.

Figures 7, 8:
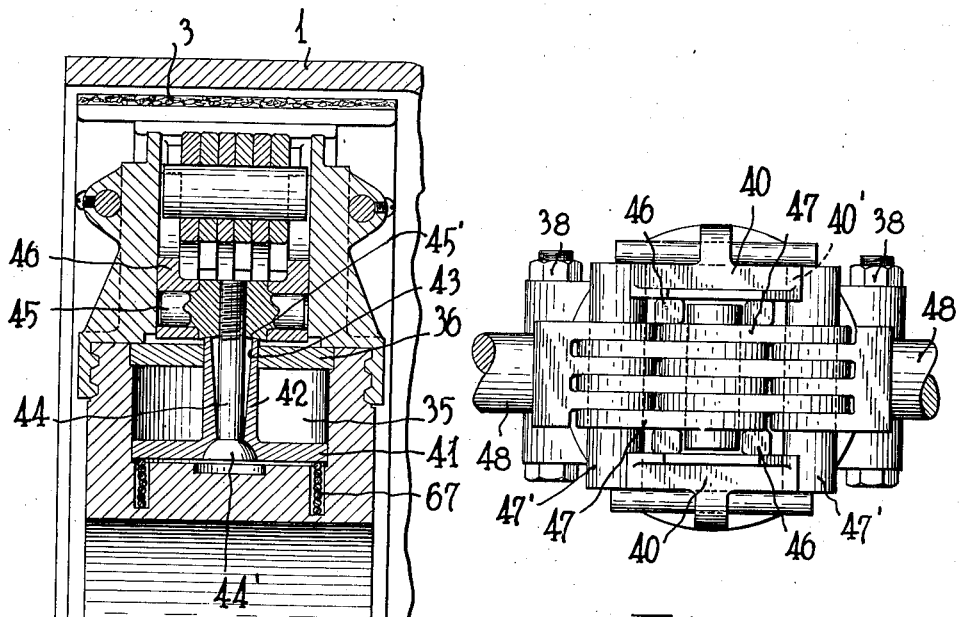
Figure 7 is a top plan view of the improved toggle construction and arrangement for forming the connection between the upper ends of the gripping shoes and the operating mechanism and Figure 8 is a vertical transverse section thereof along the line 8—8 of Fig. 1.

Positioned within the cylinder 35 is a piston 41 having a tubular extension 42, said tubular extension being formed with a conical bore 43, the diameter of said bore increasing toward the outer end as clearly shown in Figures 4 and 8. Mounted within this cylindrical extension, and projecting outwardly therefrom, is a rod 44 provided with a semi-spherical head 44' said head adapted to seat in a corresponding recess formed in the piston head as shown, whereby with this substantially ball and socket joint, together with the outwardly flared conical bore 43 of the said cylindrical extension 42, the rod 44 will be permitted a sufficient amount of play or transverse movement necessary during the operation of the device.

Secured to the outer end of this rod 44 is a pivot pin or cross head 45 pivotally supporting two fork-like cam members 46 (Figure 12), so that as the piston is moved inwardly, a corresponding movement will be imparted to said cams.

Again referring to Figures 4 and 8, it will be noted that the outer annular edges of the cylindrical extension 42 are slightly beveled or inclined downwardly and outwardly and these edges freely contact a partially spherical recess 45' formed in the lower intermediate portion of the cross head or pin 45, supporting the operating cam member 46. In assembling the piston 41, rod 44 and cross head 45, there is just sufficient clearance allowed to permit freedom of movement and lubrication between the seat 45' in said cross head and the upper edges of the cylindrical extension 42. Likewise there will also be this clearance allowed between the semi-spherical head 44' of the rod 44 and its seat in the cylinder head 41. These connections together with the outwardly flared inner bore 43 will permit a freedom of movement of the cam member 46 in all directions within certain limits sufficient to prevent binding or sticking of the parts under all working conditions. Furthermore by reason of the engagement of the upper edges of the cylindrical extension 42 with the cross head 45, upon the outward movement of the piston 41, when returned to inoperative position, the intermediate portion of the toggle mechanism, to be hereinafter referred to, will be engaged by said cross arm, (Fig. 2) and said mechanism will be returned to and maintained in inoperative position.

Mounted between the fork-like cam member 46, which is in turn positioned between the flanges 40 of the cylinder-head clamping members 37, is a toggle assembly of special design and construction for supporting the upper ends of the gripping shoes.

Referring particularly to Figures 7, 10 and 11, this toggle assembly comprises a pair of pivoted intermediate members 47 and pivotally connected to the outer end of each intermediate member, by a pin or the like 47', is a link 48, the outer ends of these links being adjustably connected to the upper ends of the respective gripping shoes 2. It will be noted that each intermediate toggle member 47 comprises a series of connected parallel web portions 49 and the inner ends of the links 48 are similarly constructed with a series of parallel web portions 50, said web portions, when the parts are assembled, adapted to interfit within desirable limits, as more clearly shown in Figure 7.

With this construction and arrangement it will be obvious that the separate semi-circular gripping shoes may function independently of each other to meet the respective drum displacements which are induced either by stress or by temperature changes or manufacturing irregularities.

Further, with particular reference to Figures 6 and 7, it will be noted that the upper outer edges of the said flanges 40 of the cylinder head clamping members 37 are provided with oppositely disposed arcuate recesses 40' positioned to receive segmental portions of the outer ends of the pivot pins 47' connecting the toggle assembly to the shoe connecting links 48. With this construction and arrangement, when the shoes 2 are in retracted position the said pivot pins 47' will be seated in their respective recesses 40' and will remain therein as long as the operating piston 41 is held in retracted or outward position.

Referring to Figs. 6, 7 and 8, cavities 40' receive, in the disengaged position, the extended ends of pins 47'. When piston 41 is in retracted or outward position it causes part 45 to force against toggle link 47 and thus firmly seats pins 47' in semicircular sockets 40' and definitely positions these pins and their connected assemblies to part 40.

The intermediate toggle members 47 are in the form of bell-crank levers, said members being pivoted together at the point 52 and the shoe connecting links 48 are pivoted to the outer ends of these intermediate members 47 at the point 51.

Carried by the lower end of each intermediate member 47 and on the opposite sides thereof are rollers or the like 53.

As hereinbefore stated this toggle assembly is mounted between the fork-like cam member 46 and in the operation of the device these rollers 53 are adapted to ride on the outer edges of these fork-like extensions, (Figs. 1 and 2).

Upon referring to Figure 12 it will be noted that these outer edges are of a particular contour providing first a substantially short curved surface 54 and an inclined surface 55, said surface cooperating with the rollers 53 in a novel manner during the operation of the aforesaid toggle by the cam member 46.

In order to provide the necessary adjustments for the gripping shoes 2, there is mounted in the upper ends of each shoe, an annular threaded nut 56 to receive the outer end of the link 48 said outer end being provided with threads 57 and a cylindrical reduced portion 58. The upper ends of said gripping shoes are also provided with bearing opening 59 and 60, in line with the adjusting nut 56 in order to accurately position said link 48. When these parts are assembled, the thread portion 57 of the link 48 is in engagement with the threads of the nut 56, whereby a rotation of said nut will cause a corresponding projection or retraction of said link to provide the desired adjustment. The outer periphery of said adjusting nut 56 is provided with spaced holes or the like 61 adapted to cooperate with a pin 62 carried by a spring or the like 63, said spring being set and positioned so as to maintain the pin 62 in any one of said holes 61 according to the desired adjustment to be maintained.

As hereinbefore stated the cam member 46 is connected to, and operated by, the piston 41. This piston, (Figs. 2 and 4) is adapted to be moved inwardly and against centrifugal force during its power stroke and this movement is produced preferably by fluid pressure. The fluid used in actual practice is the same fluid, such as oil, that is used for lubricating and cooling the device, although it is to be understood that any other fluid under pressure could be employed. For the purpose of this description however the operating fluid will be referred to as oil and for various reasons the use of oil has been found to be the most practical and convenient agent.

Two methods are herein shown for admitting and exhausting the oil to and from the cylinder 35. In Figures 1 and 2, the oil is brought in through the center of the shaft 8 secured to the support 19 by a conduit 64 and from there conveyed by passages 65 and 66 to the outer end of the cylinder 35. This oil is admitted and exhausted through these same passages as required during the operation of the device and any well known valve mechanism (not shown) may be provided for the purpose. In this arrangement just described a spring or the like 67 is provided to return the piston 41 to inoperative position.

In the form as illustrated in Figures 4, 5 and 6 no springs are used and the oil under pressure is employed for moving the piston 41 in both directions. For this purpose the face of the support adjoining the cover 15, is provided with a pair of concentric annular grooves 68 and 69 and registering with these grooves are two mating grooves 70 and 71 formed in the inner face of the cover 15, said latter grooves connecting with oil supplying passages 72 and 73 respectively, it being understood that these respective passages and grooves are alternately supply and discharge conduits according to the desired movements of the piston 41. These grooves 68 and 69 are in communication with the inner and outer ends of the cylinder 35 as shown, whereby the piston 41 will be operated to perform its desired functions.

A certain amount of oil, the same being under pressure, will leak out between the meeting faces of stationary cover 15 and the rotating support 19 and this oil will be used for lubricating the working part of the clutch mechanism, provisions being made for compensating for this leakage in order to maintain the desired pressure in the pressure lines.

In the event that this leakage oil is insufficient for proper lubrication and cooling, additional oil may be admitted through the port 18 or otherwise as determined, all excess oil being drained off through the outlet 17. The above has particular reference to the form of device as illustrated in Figure 4, but where the clutch is operated in oil as illustrated in Figure 3, oil at all times is directed under pressure through the port 18 or otherwise as determined, in addition to the leakage oil.

In the operation of the device, fluid under pressure is admitted to the cylinder 35 above the piston 41 and as said piston begins its inward travel, the fork-like cam 46 will be drawn downwardly, whereupon the short curved surfaces 54 will first engage the rollers 53 and the gripping shoes will be moved until the lower ends of said shoes are in engagement with the gripping drum 1. This slight movement will not be prevented by the locking recesses 40' as these are relatively shallow recesses and the pins 47' will automatically begin to separate from their respective recesses 40', as soon as the outward pressure is relieved from the intermediate portion of the toggle assembly when the operating piston begins its inward travel. During this movement the semi-spherical or semi-cylindrical pivotal bearing member 31 carried by the lower end of each gripping shoe, will slide on its respective bearing number 30, and this movement will be substantially uniform with respect to both shoes owing to the connecting equalizing levers 27 yet at the same time a certain amount of individual movement will be permitted by reason of the slight play between the heads 29 and the cavities 34, to compensate for any irregularities in the gripping movements. The gripping shoes are so adjusted that after the lower ends of said shoes have engaged the gripping drum, the cam member 46 continuing inwardly, the inclined surface 55 of said cam member will become engaged with the rollers 53, whereupon by reason of the toggle arrangement hereinbefore described, the upper ends of the gripping shoes will be gradually forced apart. The lower ends of said shoes having already been brought into engagement with the gripping drum, the subsequent spreading of the upper ends of said shoes will produce first a gradual and easy engagement of the parts followed by an increasing pressure contact until the desired and final engagement is obtained, all of which being conducive to a smooth and easy working device, devoid of shocks and vibration, even when working under periodic or reversing power impulses.

When the operating pressure is relieved from the cylinder 35 and the piston 41 returned to its outward position either by spring or fluid pressure, the pin or cross head 45, pivotally supporting the cam member 46 will contact the intermediate parts of the toggle members 47 and the upper ends of the gripping shoes will be drawn in and positively maintained in the retracted position as hereinbefore described until the cam member 46 is again operated to apply the clutch.

Further, since the heel of the shoe is free to translate radially outwardly and as rotative speed increases, centrifugal force would cause the heel of each shoe to move radially outwardly as against the resisting force exerted by the stiffness factor of the shoe (i. e., its resistance to a change of shape) and the centrifugal force exerted by the spring pressed plunger 24 through the lever connections 27. However, this is insufficient to completely balance the centrifugal force of the shoe mass, and therefore in addition there is provided the weight 24'. As a result, when the shoes tend to move outwardly, the weight and spring pressed plunger will be urged inwardly through the lever connection 27. The proper weight having been predetermined this will in addition to the weight and spring force of the plunger 24, balance the centrifugal forces of the shoe mass through the levers 27. Centrifugal forces are then in static balance and can not cause undesirable shoe movements.

Further, it will be noted that as the device is operated from the disengaged to the engaged position, the inward movements of the cam-operating piston and expanding mechanism would normally cause a shift of mass and an unbalanced condition, but with the above described arrangement of parts, it will be seen that as the cam, piston and cooperating members, move inwardly the equalizer weight, plunger and levers also move inwardly as the lower ends of the shoes move outwardly, and balance is thereby maintained in the assembly. Thus this equalizing function to assist in maintaining the shoes in the desired location and eliminate shoe movements under centrifugal forces will further act to maintain proper balance in either engaged or disengaged position.

It will therefore be seen that with the instant construction and arrangement, means are provided for operating the mechanism in a certain predetermined and positive manner and that these same instrumentalities for performing the gripping operations, also form the means for positively maintaining the parts in retracted or inoperative position after the device is released.

As hereinbefore stated, it is preferred to operate the clutch in oil as this oil film present between the gripping shoes and the gripping drum greatly improves the performance of the mechanism, both as to gripping effect and temperature regulation.

As already stated, in addition to leakage oil, precooled oil under pressure can be discharged into the casing through the port 18 or as otherwise determined, lubricating all the parts and collecting at the bottom of the casing. During the operation of the clutch, this oil and added oil is thrown by centrifugal force around the interior of the gripping drum, providing lubricating film between said gripping drum and the outer faces of the gripping shoes. Excess oil passing out of the rotating drum into the stationary casing and thence to the oil sump.

As the lubricating film of oil between these engaging gripping surfaces, through differential movement of the gripping surfaces into pressure engagement, as the device is engaged, becomes thinner, there is a progressive action or condition where the thickness of the film at first is adequate for surface lubrication, and the grip is very small, but as the shoes gradually become fully engaged there is a reduction in thickness of this film between the surfaces, which due to the oil film adhesion on the two surfaces, results finally in the desired gripping condition between the surfaces with only a marginal film of oil therebetween. Actual tests have proven that energy absorption and dissipation is accomplished without attrition on the engaging gripping surfaces and the work done in breaking the lubricating oil film down to a marginal film and further oil cracking absorbs most of this energy. It was further noted that if the slip of the elements of the gripping surfaces is just sufficient to create a marginal film only, and an oily condition to the gripping surfaces is immediately restored, in a repeated cycle during slipping then it is possible to obtain tremendously increased life of the gripping surfaces. It will be noted that centrifugal force will have a slipping and pressure wiping effect on any oil restrained within a cylindrical surface which is being rotated, and this force will give the action of oil under pressure moving across said surfaces. Further it will be noted that on the inner periphery of a cylindrical surface that a maximum of such action is achieved and this device secures such action.

The tenacity of oil for various materials, is well known, and likewise is known that this marginal film not only has no lubricating qualities but to the contrary has tremendous gripping or adhesive capacity. Shafting seizures in bearings that are insufficiently supplied with oil bear witness to this fact and this gripping device takes advantage of this natural physical fact. When a gripping device of this type goes from the engaged to the disengaged condition there is a definite time period of slip under power. If there were not a marginal film of oil present between the mating gripping surfaces, then attrition of these surfaces must occur. This is true of a friction clutch, but with a marginal film present between the mating surfaces this film will prevent this attrition. The energy absorbed by the oil film results in an oil cracking action that releases some carbon and vapors. The energy absorbed thus by the oil relieves the mating gripping surfaces of wear and overheating. The temperature at which the selected for use oil cracks, partially changing to carbon and gases should be lower than the critical temperature of either of the mating gripping surfaces, so that just as long as oil of this nature is supplied, and the conditions permit a marginal film to be maintained, distress to the mating gripping surfaces is at a minimum, in fact extended severe tests show scarcely measurable wear. To continue, this carbon also secures under certain conditions other highly desirable characteristics, to wit, when there is used for one mating surface, segments made of asbestos moulded with a synthetic resin and the other surface a suitable steel, the fibers of asbestos at the mating surface afford an ideal mat for the carbon to build into and as this fabric of asbestos and carbon self-builds in the manner previously defined there is reached an optimum condition where characteristics of performance are uniformly excellent and wear practically ceases on the mating surfaces, the carbon asbestos mat having high tenacity for the marginal oil film and likewise is a protective coating for prevention of gripping surface attrition.

It is of course to be understood that certain changes in detail construction may be possible to accomplish the results sought and to carry out the novel manner or method of operation, and the instant invention is limited only sofar as defined in the appended claims.

I claim:

1. In a gripping mechanism, the combination with a part to be engaged and an engaging part, of means for maintaining said parts in spaced relation when not engaged, means for causing an initial movement of said engaging part in a direction to engage at one point said part to be engaged and means for subsequently producing a circumferential progressive engagement of said parts.

2. In a gripping mechanism, the combination with a part to be engaged and an engaging part, of means for maintaining said parts in spaced relation when not engaged, a moving cam member for causing an initial movement only of said engaging part in a direction to engage at one point said part to be engaged and said cam member upon further movement subsequently producing a circumferential progressive engagement of said parts.

3. In a gripping mechanism, the combination with a part to be engaged and an engaging part, of means for maintaining said parts in spaced relation when not engaged, a moving cam member provided with a shouldered portion and an inclined portion, said portions adapted to successively engage said engaging parts the engagement of said shouldered portion causing movement of said engaging part to engage at one point and the inclined portion upon further movement of said cam member subsequently producing a progressive engagement of said parts.

4. In a gripping device, the combination with a member having a gripping surface, of an expanding element adapted to grip said surfaces, means for mounting one end of said expanding element for pivotal and sliding movement, means engaging the other end of said expanding element for causing an initial movement only of said expanding element in a direction to engage at its pivotal point said gripping surface and means for subsequently producing a progressive engagement of said expanding element and gripping surface.

5. In a gripping device, the combination with a member having a gripping surface, of an expanding element adapted to grip said surface, a combined pivotal and slidable mounting for one end of said expanding element, a cam member engaging the other end of said expanding element, means carried by said cam to cause an initial movement only of said expanding element, means also carried by said cam to subsequently produce a progressive engagement of said expanding element and gripping surface and means for operating said cam.

6. In a gripping device, the combination with a member having a gripping surface, of an expanding element adapted to grip said surface, a combined pivotal and slidable mounting for one end of said expanding element, a cam member engaging the other end of said expanding element, means carried by said cam to cause an initial transverse movement only of said expanding element, means also carried by said cam to subsequently produce a progressive engagement of said expanding element and gripping surface and means for operating said cam, the slidable and pivotal mounting and cam member for the respective ends of the expanding element also providing means for positively maintaining said expanding element in disengaged relation when said device is in inoperative position.

7. In a gripping device, the combination with a member having a gripping surface, of a pair of complementary expanding elements positioned to grip said surface, means for spacing and supporting the respective adjacent ends of said expanding elements, one of said supporting means providing a combined radially sliding and pivotal connection for the other connection, a toggle connection for the other ends of said expanding elements, a cam cooperating with said toggle to cause first a movement of said expanding elements and thereafter a spreading of said elements and means for operating said cam.

8. In a gripping device, the combination with a rotating part and a part to be rotated, of a member having a gripping surface carried by one of said parts, a hub member provided with a driving arm, a pair of complementary expanding elements positioned to grip said surface, means carried by said driving arm to slidably and pivotally support the lower adjacent ends of said expanding elements, means also carried by said driving arm to normally maintain the lower ends of said expanding elements spaced from said gripping surface, means for connecting said lower ends of the expanding elements and means positioned diametrically opposite to said driving arm for supporting and actuating the upper ends of said expanding elements.

9. In a gripping device, the combination with a rotating part and a part to be rotated, of a member having a gripping surface carried by one of said parts, a hub member provided with a driving arm, a pair of complementary expanding elements positioned to grip said surface, a radially movable plunger provided in said driving arm, transversely disposed levers also carried by said driving arm having their inner ends connected to said plunger, an arcuate slidable bearing embracing the sides of said driving arm carried by the adjacent lower ends of said expanding elements, the outer ends of said levers being in engagement with said bearings, means for causing a downward sliding movement of said bearings and connected expanding elements and means associated with said plunger and levers for automatically restoring said bearings and expanding elements to their original positions.

10. In a gripping device, the combination with a rotating part and a part to be rotated, of a member having a gripping surface carried by one of said parts, a hub member provided with a driving arm, a pair of complementary expanding elements positioned to grip said surface, means carried by said driving arm to slidably and pivotally support the lower adjacent ends of said expanding elements, a toggle for connecting the upper adjacent ends of the expanding elements, a fluid operated member positioned diametrically opposite to said driving arm, a cam cooperating with said toggle for actuating the expanding elements and means for connecting said cam to said fluid operated member.

11. In a gripping device, the combination with a rotating part and a part to be rotated, of a member having a gripping surface carried by one of said parts, a hub member provided with driving arm, a pair of complementary expanding elements positioned to grip said surface, means carried by said driving arm to slidably and pivotally support the lower adjacent ends of said expanding elements, a toggle for connecting the upper adjacent ends of the expanding elements, rollers carried by said toggle, a fluid operated piston and cooperating cylinder positioned diametrically opposite said driving arm, a cam adapted to engage said rollers for actuating the expanding elements upon the movement of said cam, means for connecting said cam to said fluid operating piston and means for admitting and exhausting an operating fluid to and from said cylinder.

12. In a gripping device, the combination with a rotating part and a part to be rotated, of a member having a gripping surface carried by one of said parts, a hub member provided with a driving arm, a pair of complementary expanding elements positioned to grip said surface, means carried by said driving arm to slidably and pivotally support the lower adjacent ends of said expanding elements, a toggle for connecting the upper adjacent ends of the expanding elements, a piston and cooperating cylinder positioned diametrically opposite said driving arm, a cam cooperating with said toggle for actuating the expanding elements upon the operation of the cam, means for connecting said cam to said piston and means for operating said piston.

13. In a gripping mechanism, the combination with a rotating part and a part to be engaged, of means for maintaining said parts in spaced relation when not engaged, means for causing a movement of said engaging part in a direction to engage at one point said part to be engaged, means for subsequently producing a circumferential progressive engagement of said parts and means for maintaining rotative balance of said parts in both engaged and disengaged positions.

14. In a gripping device, the combination with a member having a gripping surface, of a hub member provided with a driving arm, a pair of complementary expanding elements positioned to grip said surface, means carried by said driving arm to support the lower adjacent ends of said expanding elements with capacity for independent bodily radial and rotative movement of said expanding elements on said supporting means with respect to said arm, and means positioned diametrically opposite to said driving arm for producing progressive engagement beginning at said lower ends between said expanding elements and the gripping surface.

CHAUNCEY L. C. MAGEE.